T. A. C. BOTH.
MECHANICAL MOVEMENT.
APPLICATION FILED JULY 2, 1910.
993,340.
Patented May 30, 1911.
3 SHEETS—SHEET 3.
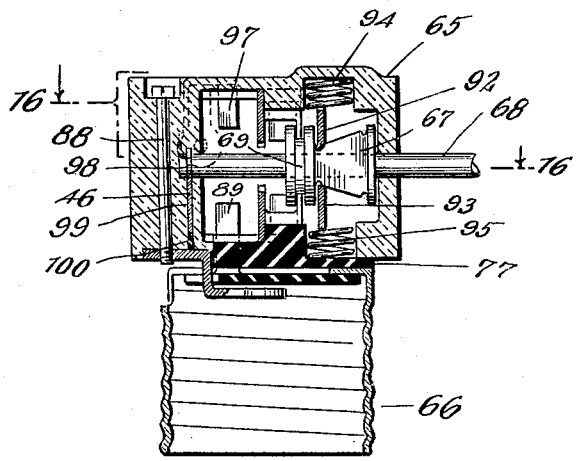
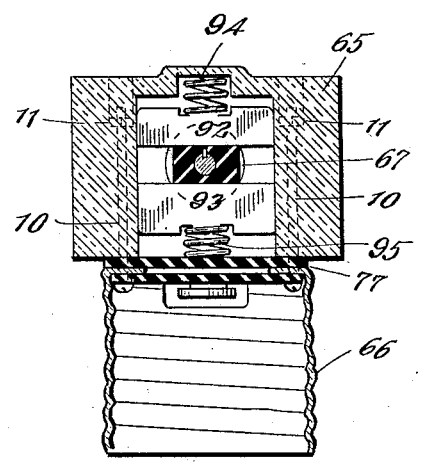
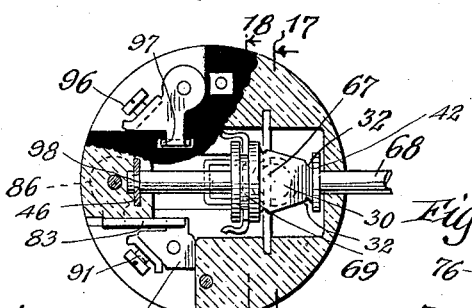
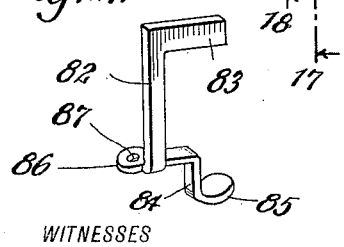
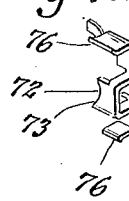
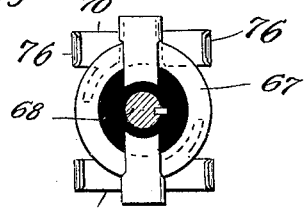
WITNESSES
INVENTOR
Tonjes A. C. Both
BY
Alan M Johnson
ATTORNEY

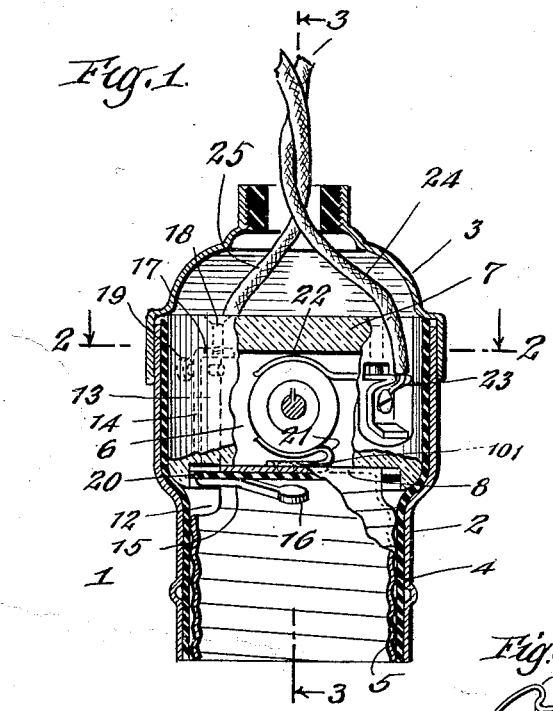

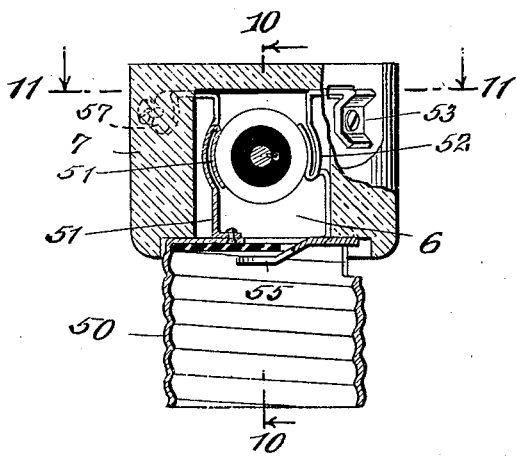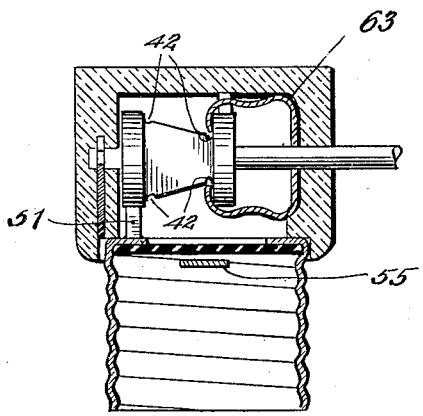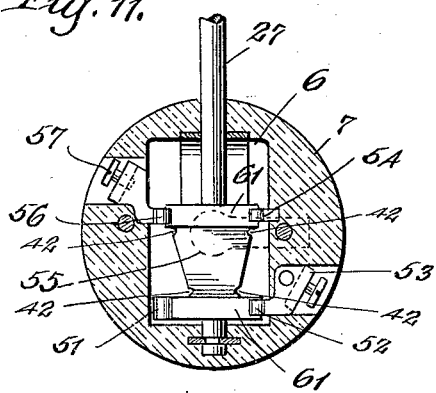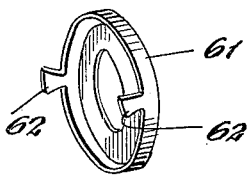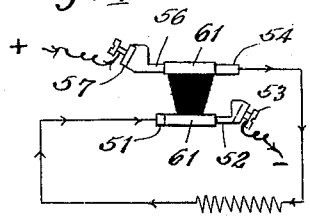

UNITED STATES PATENT OFFICE.

TONJES AUGUST CARL BOTH, OF NEW YORK, N. Y., ASSIGNOR TO IDA S. ROSENHEIM, OF NEW YORK, N. Y.

MECHANICAL MOVEMENT.

993,340.  Specification of Letters Patent.  Patented May 30, 1911.

Application filed July 2, 1910. Serial No. 570,138.

*To all whom it may concern:*

Be it known that I, TONJES AUGUST CARL BOTH, a citizen of the United States, and a resident of New York, in the county of New York and State of New York, have invented certain new and useful Improvements in Mechanical Movements, of which the following is a specification, taken in connection with the accompanying drawings, which form a part of the same.

This invention relates to mechanical movements adapted for universal application and is an improvement upon U. S. Patent #943,274, patented December 14, 1909. I have shown my mechanical movement located in an electric light socket and adapted to make and break the current therein, though it is to be distinctly understood that my invention is not to be limited to this or any other particular use.

My invention further relates to an electric light socket in which my improved mechanical movement is used, all of which will be hereinafter described in the specification and pointed out in the claims.

In the accompanying drawings showing illustrative embodiments of my invention and in which the same reference numerals refer to similar parts on the several figures,—Figure 1 is a vertical section through an electric light socket equipped with my invention, a part of the figure being shown in side elevation for the purpose of better illustration; Fig. 2 is a transverse horizontal section substantially on the line 2—2 of Fig. 1; Fig. 3 is a vertical section substantially on the line 3—3 of Fig. 1; Fig. 4 is a detail perspective view of one form of locking plate; Fig. 5 is a detail perspective view of one form of driven member; Fig. 6 is a detail perspective view of one form of resilient member; Fig. 7 is a fragmentary vertical section substantially on the line 7—7 of Fig. 2; Fig. 8 is a side elevation of one form of driving member, axle or arbor; Fig. 9 is a vertical section through my double pole electric light socket; Fig. 10 is a vertical section substantially on the line 10—10 of Fig. 9; Fig. 11 is a horizontal section on the line 11—11 of Fig. 9; Fig. 12 is a detail perspective view of one form of conducting or bridge plate; Fig. 13 is a detail perspective view of one form of driven member; Fig. 14 is a diagrammatic view showing the passages of the current in my double pole socket; Fig. 15 is a vertical section through a modified form of double pole socket; Fig. 16 is a longitudinal section substantially on the line 16, 16 of Fig. 15; Fig. 17 is a vertical section substantially on the line 17, 17 of Fig. 16; Fig. 18 is a vertical section substantially on the line 18, 18 of Fig. 16; Fig. 19 is a detail end view showing the arrangement of the driven member and the laterally movable contact plates; Fig. 20 is a detail perspective view of one form of laterally movable conducting or bridge plate; Fig. 21 is a detail side elevation of a center contact; and Fig. 22 is a detail perspective view of one form of spring actuated plate.

I have shown my invention applied to a single pole electric light socket and also two different forms of double pole electric light sockets. The single pole construction shown in Figs. 1–7 will be first described.

In the illustrative embodiments of the invention shown in the drawings, 1 is an electric light socket having the usual or any approved outer shell 2, a cap 3 and with any form of insulation 4 between the shell and the screw shell contact 5, Fig. 1. The insulation which is usually used to line the cap 3 may be employed, if desired, but preferably is omitted. The shell, cap and insulation form no part of my invention and therefore will be disregarded in the further description of the invention.

To house and thoroughly protect my mechanical movement, when it is used as the operating switch mechanism in an electric light socket, I mount it in the interior 6 of a hollow insulating receptacle 7 usually formed of porcelain or some other suitable material. This receptacle 7 is closed on all sides except the bottom which is closed by the head 8 of the screw shell contact 5. This screw shell contact is held to the closed insulating receptacle 7 in any suitable manner such as by means of the screws 10, 10, Figs. 2 and 7, coöperating with nuts 11, 11, Fig. 17. The upper portion of the screw shell is cut away at 12 for the reception of the center contact 13, Fig. 1. This center contact comprises a post 14 and at its lower end an arm 15 terminating in a spring contact 16, Fig. 1, which makes connection with the center contact of the lamp or other consuming device, not shown. The upper end of the post 14 has a flange 17 bent substantially at right angles to it and is provided with a screw threaded aperture to coöperate with a screw 18, Fig. 1. The binding screw 18 is also located in the post as is clearly shown in dotted lines in Fig. 1. The arm 15 is insulated from the head 8 of the screw shell 5 in any suitable manner as by a piece of mica 20.

I preferably connect a spring contact 21 to the head 8 of the screw shell 5 in any suitable manner as by rivets 101, arranging it so that it will be substantially opposite a similar spring contact 22 carried by the binding post 23 to which the return wire 24 is connected, it being understood that the feed wire 25 is connected to the binding screw 19. In the arrangement of the parts shown the current will therefore pass through the wire 25, the center contact 13 and spring contact 16 down through the lamp or other consuming device and out through the shell contact 5, the spring contacts 21, 22 and wire 24, if there is a suitable connection made between the spring contacts 21—22. Means to make this connection between these two spring contacts 21—22 so that both a quick make as well as a quick break are assured, form a part of my mechanical movement. It has been old prior to my invention to make a quick break between the electric contacts but not to make a quick make as well as a quick break. Both of these are essential to prevent arcing and burning out of the parts.

My mechanical movement which can be used to operate any suitable element is here shown operating a conducting or bridge plate 26 to make a quick make as well as a quick break between the contacts 21—22. It includes essentially a driving member which is here shown as an axle or arbor 27, adapted to be rotated in either direction and a driven member 28 splined to the driving member, together with one or more yielding members to coöperate with the driven member. This driven member 28 comprises a single member which is preferably made of some insulating material such as porcelain, or other suitable material, Fig. 5, and is provided with oppositely inclined surfaces 29 and 30 forming opposed hills 31 and valleys 32. On one end of the driven member 28 I secure in any suitable manner the conducting or bridge plate 26 to make the connection between the spring contacts 21, 22. This connection may be made in various ways, but preferably in this form of my invention the plate 26 is given substantially the shape of a disk with a flange 53, the end 34 of which is crimped or bent over the rim 35 of the driven member 28; though other means of holding the plate 26 may be used, if desired.

At substantially diagonally opposite points on the interior of the closed insulating receptacle 7, I provide recesses 36, 36 each of which has an auxiliary recess 37 substantially at right angles to it. Within these recesses 36 I mount one or more resilient members, such as bent springs 38, Figs. 6 and 2, with a bent portion 40 and an ear 39, the bent portion 40 being adapted to snugly fit into the recesses 36, 36 and the ears 39, 39 fitting within the auxiliary recesses 37, 37, Figs. 2 and 6. The ends 41, 41 of the springs 38 are adapted to coöperate with the oppositely inclined hills and valleys 31 and 32 on the driven member 28. These members may also be provided with notches 42, 42 to coöperate with and hold the ends 41 of the spring 38 or springs, if more than one spring is used. In other words the ends of the springs which happen to be the resilient members in this case are held in the notches until the spring has stored up its maximum energy when, upon the completion of the rotary movement of the driven member, the notches are disengaged from the resilient member and the spring member instantly tends to actuate the driven member to make or break with a quick snap the electrical current as the case may be.

The driving member, in the form shown, comprises the axle or arbor which is preferably formed from metal and is provided with a cut out portion or kerf 43 for the reception of the detachable spline or feather 44, which is forced into the kerf 43 in the driving member 27. This driving member 27 is also at one end preferably provided with a circumferential groove 45 to coöperate with the locking plate 46, Figs. 3 and 4. This plate is dropped into a recess 47 in the closed receptacle 7 and is preferably insulated from the top 8 of the shell 5 by any suitable insulation such as 48. This locking plate 46 coöperating with the groove 45 serves to prevent the accidental or unauthorized removal of the driving member 27 with its handle or key 49. This key or handle in the form of my invention shown, may be metal as it is insulated from those portions of the socket through which the current passes.

Upon rotating the key 49 with its axle or arbor 27 approximately 90 degrees in either direction, the insulating driven member 28 is caused also to rotate to the same extent which will force apart the ends 41, 41 of the springs 38, 38 causing them to move from a "valley" to a "hill". In this position of the parts the ends 41, 41 of the springs 38, 38 if two springs be used, will move down the inclined surfaces 29, 29 or 30, 30 as the case may be, until they reach the opposite valley where they will come to rest. In doing this, however, the driven member 28 is given a quick movement or snap laterally which will cause it to move from the position shown in Figs. 1 and 2 and quickly break the electrical connection between the bridge plate 26 and the spring contacts 21—22. A further rotation in either direction of the driving member 27 another 90 degrees will reverse this operation and cause the driven member to move quickly, with a snap, back into the position shown in Figs. 1 and 2 to again make the electrical connection between the spring contacts 21, 22. In this manner both a quick make as well as a quick break are made by my mechanical movement when it is used as an electric switch mechanism, thereby eliminating all arcing not only upon the breaking of the current, but also upon making it. Furthermore, the entire switch mechanism is located within the closed insulating receptacle 7 and thoroughly housed and protected from moisture, dust or other foreign substances.

My invention is also adapted to be used with a double pole electric light socket. One form of such double pole socket is shown in Figs. 9 to 14, and another form in Figs. 15 to 22 inclusive. In the first form of double pole socket, that above referred to, the closed insulating receptacle 7 is the same as in the device previously described. In this form the screw shell contact 50 is provided with an upwardly extending screw shell contact 51 arranged opposite and separated from a spring contact 52 connected to the binding post contact 53. Within the interior 6 of the closed insulating receptacle 7 I also provide a spring contact 54 connected with the center contact 55 and arrange it opposite to, and separated from, another spring contact 56 which is connected to the binding post 57. On the driving member 27 I spline a porcelain or other insulating driven member 58 having at one end a rim 59 and at the other a rim 60, and upon each rim I mount a conducting or bridge plate 61, 61, such for example as shown in Fig. 12. These plates 61 may be secured to the porcelain or other insulating driven member 58 in any suitable manner. Preferably I secure them by providing them with ears 62, 62 which can be bent around the rims 59 and 60. The driven member 58 between the conducting or bridge plates 61, 61, is provided with oppositely inclined surfaces 29 and 30 forming opposed hills 31 and valleys 32, the same as shown in Fig. 5. Upon these hills and valleys any suitable resilient member is adapted to operate, such as the spring 63 shown in Fig. 10. It will therefore be seen that in this form of my invention the electric light socket is a double pole one, there being four contacts, two for each wire. When the driven member 58 is in the position shown in Fig. 11 wherein the forward conducting or bridge plate 61 is brought into contact with its respective spring contacts 51, 52, and the rear conducting or bridge plate 61 is brought into contact with its spring contacts 54, 56, the current will pass as shown diagrammatically in Fig. 14, coming in at the binding post 57 passing through its spring contact 56, rear bridge plate 61 on the driven member 58, spring contact 54, thence through the center contact 55, through the lamp or other consuming device 64 back to the shell contact 50, spring contact 51, forward bridge plate 61, spring contact 52 out through the binding post 53. A partial rotation of the driving member 27 in either direction sufficient to cause the spring 63 to coöperate with the opposed hills and valleys, as previously described, will cause the porcelain or insulated driven member 58 to snap back and quickly break all four contacts. A further partial rotation of the driving member 27 and the driven member 58 will cause the latter to reverse its movement and quickly snap the respective conducting or bridge plates 61, 61 between their respective spring contacts and thereby quickly make the electrical connection. This double pole socket permits currents of high voltage to be safely used. By using my mechanical movement as a switch mechanism for such a double pole socket, all four contacts are not only quickly broken, but are also quickly made; both the making and breaking being almost instantaneous and thereby eliminating all arcing on the making as well as the breaking of the current.

In Figs. 15 to 22 I have shown a little different arrangement of the double pole electric light socket. In this form my insulating receptacle 65, of porcelain or other suitable material, is entirely closed except the bottom which is closed by the top of the screw shell contact 66, an interposed insulating disk 77 being preferably employed. This screw shell contact 66 and the interposed insulating disk 77 are held to the insulating receptacle 65 by any suitable means such as by the screws 10, 10 and nuts 11, 11 Fig. 17. In this form of my invention, the driven member 67 is splined or otherwise properly secured upon the driving member 68 as in the other constructions and is formed of porcelain or other suitable insulating material and is provided at one end with a circumferential groove 69, Fig. 16. It is also provided with similar oppositely inclined surfaces 29, 30 forming opposed hills 31, 31 and valleys 32, 32. Loosely mounted within the circumferential groove 69 and separated from each other are two conducting bridge plates 70 and 71, respectively, which are alike but coöperate with different contacts. These bridge pieces are of peculiar construction, one of them being shown in Fig. 20 in perspective. They each consist essentially of two connected U- shaped members having a connecting portion 72, which is preferably formed concave on its edge 73, its surface forming a segment of a circle whose diameter is greater than that of the driving member 68. On each end of the bridge plates 70 and 71 are spring jaws 76, 76 which yieldingly engage the fixed contacts to be hereinafter described. In the insulating disk 77 I preferably provide recesses or guideways 78, 78 within which slide the parallel projections 79, 79 of the bridge plate 71. The similar projections 79, 79 on the bridge plate 70 are guided in grooves 80, 80 formed in the head 81 of the one piece insulating receptacle 65. From this manner of loosely mounting the bridge pieces 70 and 71 in the circumferential groove 69 it will readily be seen that they move with the driven member 67, but they are not rotated as the driving and driven members are given a partial revolution in either direction to actuate the driven member laterally. This insures the bridge pieces 70 and 71 always coacting with their respective contacts. The center contact may be of any approved construction; for purposes of illustration I have shown it comprising a substantially inverted L-shaped member 82 having a forwarding extending contact 83 and a foot 84, one end 85 of which contacts with the center contact of the lamp or other consuming device (not shown), the other end of the foot being enlarged at 86 and apertured at 87 for the reception of some proper securing mechanism such as a screw 88 which takes into the threaded aperture 87, Figs. 15 and 21. I also connect a contact 89 to the screw shell 66 having it extend up into the opening in the receptacle 65 and locate it opposite a terminal contact 90, Fig. 18, which is connected with a binding post 91, Fig. 18. To coöperate with the hills 31 and valleys 32 on the driven member 67 I arrange one or two spring pressed plates 92 and 93, each being operated by springs 94 and 95, respectively, the former, preferably though not necessarily, resting in a recess in the head of the insulating receptacle 65 and the other spring 95 resting upon the insulating disk 77. From the mechanism previously described it is clear that upon the partial revolution of the driving member 68 90 degrees in either direction, the driven member 67 will be also caused to rotate with the driving member. This will cause the spring pressed plates 92, 93 to be forced apart and thereby store up energy in the springs 94 and 95 until, what is termed in this specification a "hill" is brought into contact with the plates 92 and 93 when the energy in the springs 94 and 95 will then exert itself to cause the plates 92 and 93 to move down the incline surfaces into the opposed valleys. This, as previously described, will cause a quick snap of the driven member in the opposite direction, either to make or break the current as the case may be.

In the present construction the partial rotation of the driving member 68 and the driven member 67 will not effect the conducting bridge plates 70, 71 which are loosely mounted in the circumferential groove 69. The longitudinal movement of the driven member, however, controls and actuates both bridge or contact pieces 70, 71 to move them to or from their coöperating contacts to make a double pole quick make and quick break electric light socket. If the positive wire is connected to the binding post 96, by way of example, the current will pass into the contact 97 connected to that post, then through the bridge piece 70 over to the contact 83 carried by the center contact 82, thence through the foot of that contact 85, through the lamp or other consuming device, thence to the screw shell contact 66, contact 89, Fig. 18, bridge piece 71, contact 90 to the corresponding negative binding post 91. To break the contacts the driving and driven members are given a partial rotation of 90 degrees in either direction as previously described, which, however, will not rotate the bridge pieces 70 or 71, when the spring plates 92 and 93 will cause the driven member 67 to give a quick snap longitudinally of the driving member 68 and carry with it both plates 70 and 71, thereby making a quick break between each plate 70 and 71 and their respective coöperating contacts. A further rotation of 90 degrees in either direction will reverse the movement of the bridge pieces 70, 71 in a manner previously described, and cause them to snap back and make a quick make with their respective coöperating contacts. I, therefore, in this construction have also both a double pole quick make and quick break electric light socket and one which is entirely inclosed and protected in the one piece insulating receptacle, though of course it is to be understood that as a mechanical movement my invention is not to be confined to this or any other particular form of housing.

The driving member 68 is at one end provided with a circumferential groove 98 which is similar in all respects to the grooves previously described and coöperates with a locking plate 46 which is dropped into a slot 99 in the receptacle 65, a piece of insulation 100 being preferably interposed between it and the center contact 82 as clearly shown in Fig. 15.

Having thus described this invention in connection with the illustrative embodiments thereof to the details of which I do not desire to be limited, what is claimed as new and what it is desired to secure by Letters Patent is set forth in the appended claims:

1. In a mechanical movement the combination of a driving member, a driven member mounted on the driving member adapted to have a limited longitudinal movement in relation thereto and provided with oppositely disposed inclined surfaces forming hills and valleys, a plurality of fixed springs adapted to coöperate with the hills and valleys and means to immovably secure one end of each spring permitting the other end of each spring to directly contact with the hills and valleys.

2. In an electric light socket the combination of a single closed insulating base or receptacle having an open mouth, a screw shell contact closing the mouth of the receptacle, an axle, driving member or arbor mounted in the receptacle, an insulating driven member mounted on the axle, said driven member being provided with oppositely inclined surfaces forming hills and valleys, and adapted to have relative longitudinal movement on the driving member, fixed yielding means operating on the hills and valleys of the driven member, yielding contacts mounted in the receptacle, and a metallic ring secured to the insulating driven member and adapted to contact directly with the yielding contacts.

3. In an electric light socket the combination of a metallic driving member provided with a metallic key or head, an insulating driven member splined to the metallic key, said member being provided with oppositely inclined surfaces forming opposed hills and valleys, a conducting member carried by the driven member, contacts with which it directly connects, and fixed yielding means operating on the hills and valleys.

4. In a mechanical movement the combination of a driving member, a driven member mounted on the driving member and adapted to have a limited longitudinal movement in relation thereto and provided with oppositely disposed inclined surfaces forming hills and valleys, a support provided with one or more recesses, and one or more fixed springs having one end bent to snugly fit the recesses and be securely held therein, the other end of the spring or springs being free to contact with the hills and valleys.

5. In an electric light socket the combination of a driving member, an insulating driven member mounted on the driving member and adapted to have a limited longitudinal movement in relation thereto and provided with oppositely disposed inclined surfaces forming hills and valleys, one or more conducting members carried by the driven member, contacts with which the conducting members are adapted to contact, and yielding means coöperating with the hills and valleys.

6. A key for an electric light socket provided with an indented portion and a circumferential groove, and a removable wedge inserted in the indented portion.

TONJES AUGUST CARL BOTH.

Witnesses:
 LEON STRAUSS,
 B. STRAUSS.